May 22, 1934.  J. BIJUR  1,959,340
CENTRAL LUBRICATING SYSTEM
Filed July 25, 1929  2 Sheets-Sheet 1
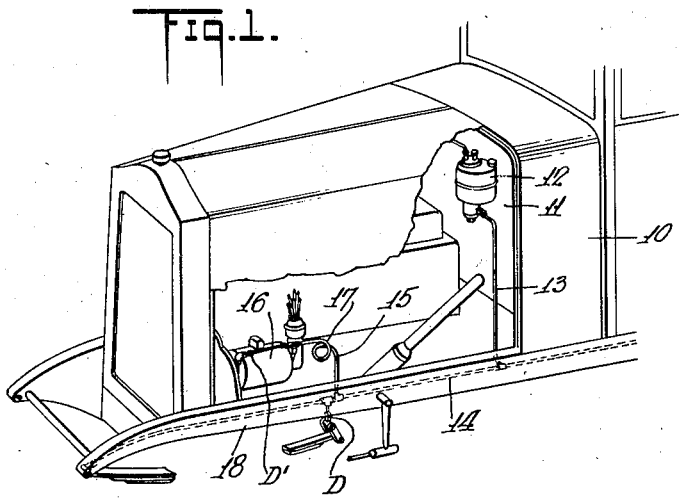
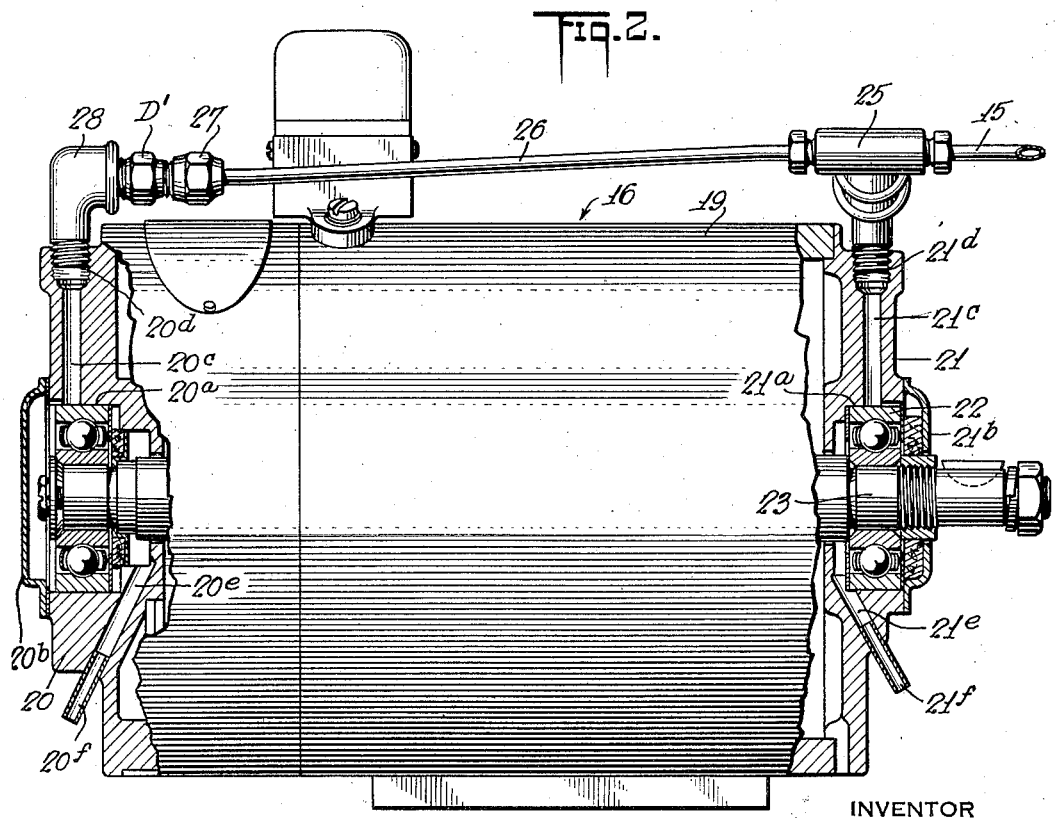
INVENTOR
Joseph Bijur
BY
his ATTORNEYS

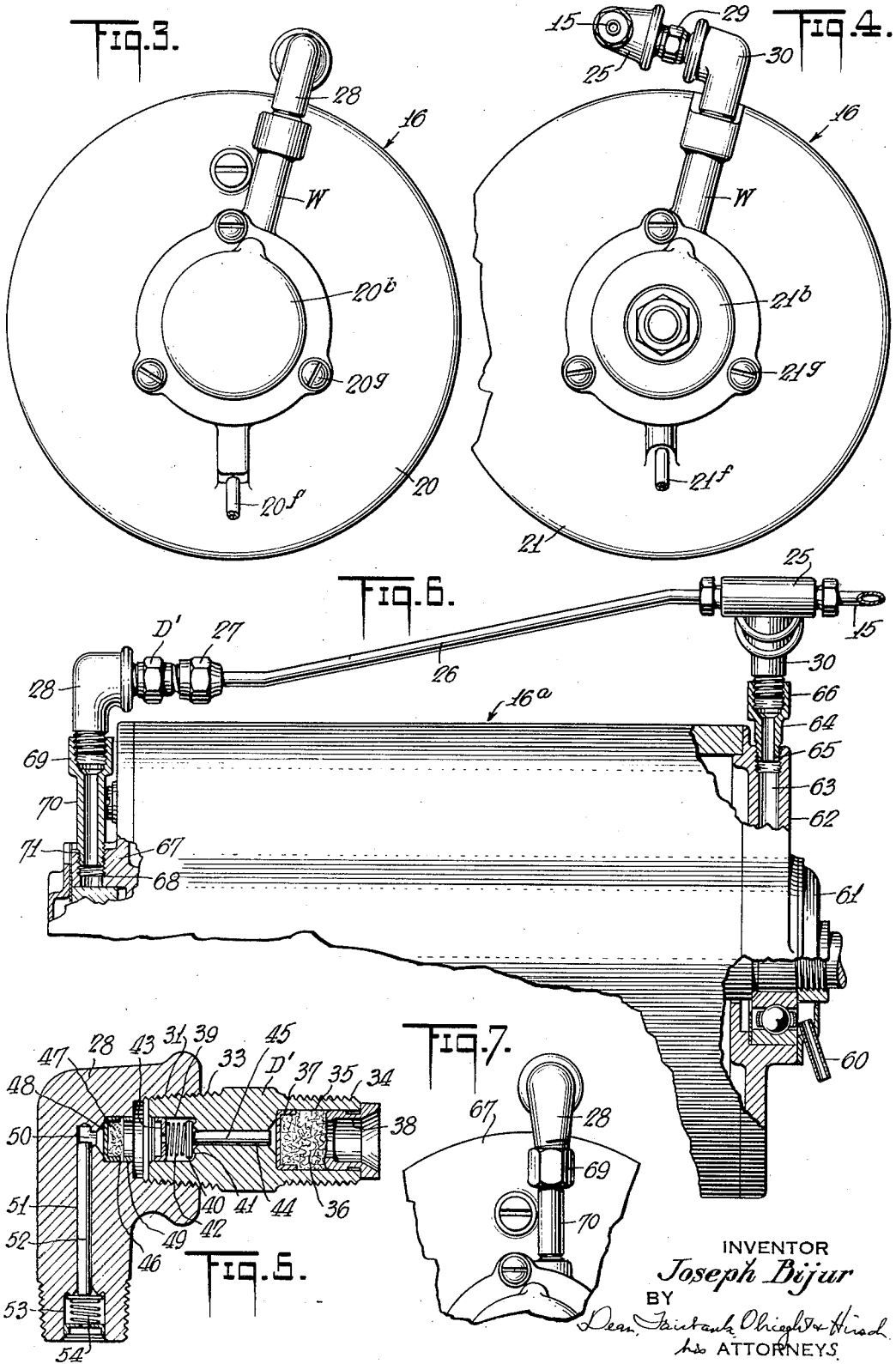

Patented May 22, 1934

1,959,340

UNITED STATES PATENT OFFICE 1,959,340

CENTRAL LUBRICATING SYSTEM

Joseph Bijur, New York, N. Y., assignor to Auto Research Corporation, a corporation of Delaware Application July 25, 1929, Serial No. 380,838

22 Claims. (Cl. 184—7)

My present invention is concerned with central lubricating systems and particularly with lubricating various bearings of accessory machines or mechanisms of an automotive vehicle, such for instance, as the generator or other machines requiring but a minute quantity of lubricant over a long period of time. The invention is more especially concerned with the lubrication of this type of machine from the same central source of lubricant which delivers, under pressure, correctly proportioned amounts of oil to the chassis bearings.

An object of the invention is to embody an oiling mechanism for a generator or other accessory machine in a chassis lubricating system of this type, and in spite of the exceedingly slight amount of oil required by the generator, effectively to lubricate the same without danger of overoiling or insulating the commutator brushes or other contact elements even when the oil is exceptionally fluid in summer.

Another object is so to design the oil inlets for the bearings of the generator or other accessory machine that even though they be well above the level of the other outlets of the system they will not vent the system or permit leak therefrom.

Another object is to prevent the relative movement between generator or other accessory machine and chassis incidental to severe chassis vibration from affecting the proper distribution to the generator.

Another object is to provide an oil inlet fitting of the drip plug type which in spite of the extremely high oil flow resistance which must be provided does not involve the use of special machining operations but permits the use of standard type plugs such as those disclosed in my prior Patent 1,632,772, dated July 14, 1927, and which are capable of mass factory production.

Another object is to provide an oil supply system especially in the form of a generator attachment, which by the use of one or more simple adaptor fittings is applicable to substantially all standard makes of generators.

Another object is to provide a generator unit fully equipped with a complete lubricant flow piping system and control fittings and capable of lubrication from a central source by simply coupling the generator oil inlet to the source.

In accordance with a preferred embodiment of the invention, I preferably provide the end castings of the generator in which the generator shaft bearings are mounted with special oil inlets, and furthermore provide drain pipes to carry away any excess of oil and prevent it from reaching the commutator brushes or other parts of the generator structure which it is undesirable to insulate by an oil film.

The inlet fittings are preferably in the nature of drip plugs of the general character described in my prior patent above referred to. These drip plugs in combination with the drip plugs at the chassis bearings serve as the highly restricted flow proportioning outlets of an equi-potential liquid filled distributing conduit system into which lubricant from a central reservoir is intermittently or continuously forced under pressure during normal running of the vehicle.

My prior patent discloses the use of drip plugs having standard bores with rated restriction pins substantially filling them, the minute crevices between the bores and the pins determining proportional rate of flow through the various drip plugs of the system. In commercial practice the plugs which permit a comparatively higher rate of flow, that is to say, several drops a minute may have a clearance of two to six one-thousandths of an inch between the pin and its bore, whereas the most highly restricted plugs which have proven feasible for purpose of volume production with ordinary equipment have a clearance of about one or two-thousandths of an inch.

For purpose of generator lubrication, where the oil is being supplied to the generator from the same source which feeds various other bearings in the car many of which require a comparatively great volume of oil, even the smallest rated drip plug fitting which it is feasible to manufacture would result in an over-supply to the generator and it is therefore necessary to impose a still higher resistance at the oil inlets of the generator.

In accordance with the present invention I have accomplished this result by the provision of a plurality of drip plugs in series at the generator oil inlets so that a pump even if working continuously during running of the car and which may be delivering fairly large quantities of oil at the steering knuckle bearings, for instance, will deliver only a drop or two of oil per day to the generator. If even this minute quantity should cause an oil accumulation at the generator bearings after a long period of time, the overflow arrangement acts to prevent over-oiling or soiling of the contacts.

Means is provided for applying the inlet fittings to the generator end castings with expedition and facility and means is additionally provided for preventing any looseness at these fittings due to vibration of the vehicle. This result is preferably accomplished by using a bridging conduit connection between the generator inlet fittings and a main of the conduit system which bridging connection is self-accommodating to take up vibration, being preferably bent upon itself to provide at least one convolution in its length.

With the inlet fittings and associated conduits assembled on the generator the device is ready for lubrication from any central source and needs no special further assembly or adjustment other than coupling its oil inlet to a supply line from the source.

The invention may be more fully understood from the following description in connection with the accompanying drawings wherein Fig. 1 is a fragmentary perspective view showing the forward end of an automobile chassis with the hood broken away to disclose the central lubricant reservoir, part of the conduit system and the special means for conveying lubricant from this system to the generator.

Fig. 2 is a considerably enlarged view showing the generator mainly in elevation and the end castings in vertical section.

Figs. 3 and 4 are end views of the respective end castings of the generator.

Fig. 5 is a sectional detail on an enlarged scale of the series drip plug arrangement which serves as the oil inlet to the generator castings.

Fig. 6 is a view generally similar to Fig. 2 but illustrating a slight modifiaction, parts being broken away, and Fig. 7 is an end elevational detail of the generator shown in Fig. 6.

Referring first to Fig. 1 of the drawings reference numeral 10 designates an automobile, on the dash board 11 of which is mounted a reservoir unit 12 adapted to contain a supply of lubricant, which, either continuously during running of the vehicle or intermittently at the will of the driver is pumped or otherwise forced through conduit 13 to the main conduit lines 14 of a liquid filled distributing system from which the liquid escapes through properly rated flow restricting outlets such as the drip plugs D.

These drip plugs may be generally similar to the drip plug D′ which I have shown in detail at the generator inlet fittings and which will be hereinafter described. In fact the drip plug D′ of Fig. 5 is similar to those used at the various chassis bearings except that it is of maximum resistance while the chassis drip plugs will be of varying degrees of resistance in accordance with the particular lubricant requirements of the bearings.

The branch 15 of the conduit system which leads to the generator 16 is, like the rest of the system, of fairly small-bore copper tubing and is preferably looped intermediate its ends to define at least one extra convolution 17, so that the generator oil inlets are not affected by vibration of the generator relatively to the channelled chassis frame member 18 upon which the conduit branch 14 is mounted.

In Figs. 2, 3 and 4, I have illustrated on a considerably larger scale the details of one substantially conventional type of generator, the construction of which has been slightly altered to adapt it for lubrication by my improved system. This generator includes the usual cylindrical body portion 19 and the end castings 20 and 21 closing the body and housing ball bearing units 22 in which are journalled the ends of the generator shaft 23.

The end castings 20 and 21 are provided with central openings $20^a$ and $21^a$ therein to accommodate the ball bearing units. These openings intersect the outer faces of the castings and are normally closed by removable cap members $20^b$ and $21^b$ in order to facilitate assembly of the ball bearing units 22 and access to such bearings for purposes of replacement or repair.

The castings 20 and 21 are provided with vertical passage ways $20^c$, $21^c$ formed in radial webs W of the castings and extending from the ball bearing recesses $20^a$, $21^a$ upwardly to inlet sockets $20^d$, $21^d$ into which the oil inlet fittings are adapted to be screwed.

In order to guard against excess oil in the pockets or recesses $20^a$ $21^a$ entering the generator and producing an oil film on the commutator brushes, pockets $20^a$, $21^a$ are drained by downwardly and outwardly inclining passages $20^e$, $21^e$ integral with the end castings. Excess oil preferably flows from these passages through projecting tail pipes $20^f$, $21^f$ and drips clear of the generator into the usual drip pan of the engine.

The construction as above described is such that oil flowing downwardly through the passages $20^c$, $21^c$ and lubricating the bearings 22 and the shaft 23 will have little or no tendency to creep into the interior of the generator due to the interposition of the drain pipes in the path of excess oil flowing from the respective bearings.

In practice the drain pipes are largely a safeguard to carry off excess oil, since the special, high resistance inlet fittings which I shall now describe are operative to feed at such an exceedingly slow rate that only a minute quantity of oil reaches the generator bearings even after long periods of use.

The bridging conduit 15 from the main conduit 14 connects with a T coupling 25 adjacent socket $21^d$.

A conduit 26 extends along the top of the generator and is connected as by a compression coupling 27 to the oil inlet fitting 28 of the socket $20^d$. Similarly the T connection 25 is coupled as at 29 (see Fig. 4) into the oil inlet fitting 30 of the socket $21^d$.

The oil inlet fittings at the two ends of the generator may be identical and therefore a description of the fitting 28 illustrated in detail at Fig. 5 will suffice for both. This fitting, as suggested above, includes a pair of very slow feeding drip plugs connected in series so that their resistance is double. Fitting 28 is of generally L shape having a socket 31 in its shorter horizontal arm into which a standard drip plug D′ may be screwed. The body of this drip plug has one end externally threaded at 33 to screw into the socket and its other end externally threaded at 34 for engagement with the coupling member 27. The enlarged socket 35 in the end 34 of the drip plug D′ receives a wad of felt material 36 this wad being held pressed into a wire mesh retaining cup 37 by a compression retaining collar 38.

In a smaller socket 39 at the other end of the plug, a one-way valve 40 is pressed against its seat 41 by a light coiled compression spring 42, the latter reacting against an apertured retaining cup 43 press-fitted into the open end of the socket 39. The longitudinal bore 44 connecting sockets 35 and 39 is substantially filled by a restriction pin 45, the flow of oil being through the felt wad 37 then through the highly restricted crevice afforded between the pin 45 and wall of the bore 44 then past the one-way valve 40 and through the cup 43.

The body 28 serves itself as the body of a second drip plug or flow resistance element and to this end the bottom of the socket 31 is provided with a recess 46 in which a wad of felt 47 with its wire basket 48 is held by collar 49. A short horizontal bore 50 connects the recess 46 with the top of a vertical bore 51, the latter receiving the restriction pin 52 and communicating at its lower end with a socket 53 in which a valve assemblage designated generally at 54 and similar to the valve assemblage above described is mounted. The lower end of the longer vertical portion of the L shape member 28 screws into the socket 20$^d$.

From the foregoing description it will be seen that when oil is supplied to the conduit system 14 the high flow resistance afforded by the series-connected drip plugs at the generator inlet fittings will permit a most minute seepage of oil along the walls of the passages 20$^c$ and 21$^c$ and thence to the generator bearings. This oil will be distributed by the generator bearings to effect their complete lubrication and if any unconsumed excess remains it will drain slowly from the tail pipes 20$^f$, 21$^f$ dripping clear of the generator. While a single check valve in each inlet fitting is sufficient to exclude air from the oil distributing system, the two valves in series not only afford double security in this respect but increase the flow resistance of the fitting and further slow down the rate of oil seepage.

In Figs. 6 and 7, I have shown the invention adapted to a generator with no substantial alteration of ordinary standard construction. In the form shown in Figs. 2, 3 and 4 practically the only change from standard in the generator castings themselves is the provision of the radial webs "W" on the end castings which accommodate the bores 20$^c$ and 21$^c$ and the drilling of the castings to provide the drain bores 20$^e$, 21$^e$. With the form of invention shown in Figs. 6 and 7 no special drilling of the castings for drain bore purposes is necessary and I simply tap drain pipes 60 into the lower parts of the end caps 61. One of the end castings 62 of this generator is conventionally provided with a vertical oil inlet bore 63 and the inlet fitting 30 in this case is directly coupled to the mouth of bore 63 by a coupling sleeve 64 having a reduced end 65 screwed into the top of the bore 63 and enlarged end 66 into which the lower end of fitting 30 is screwed.

Similarly at the opposite end of casting 67, the vertical oil hole 68 is conventional and the fitting 28 is screwed into the enlarged upper end 69 of a vertical adaptor pipe 70, the lower end of the latter being screwed as at 71 into the oil hole 68.

It is worthy of note that the oil fitting assembly for the generator affords a substantially rigid unitary construction when mounted, that is to say, the fittings 28 and 30, the T coupling 25 and the connecting pipe 26 are rigidly connected together and they in many instances may be assembled as a unit, and then applied either to the specially constructed generator of Figs. 2, 3, 4 or to a standard generator equipped with the adaptor fittings 70 and 64 as shown in Figs. 6 and 7.

In either event the inlet fittings 28 and 30 are well suited for application to either type of generator or to various other standard types of generators equipped with proper adaptor fittings.

Either type of generator here illustrated may be assembled at the factory with its oil inlet fittings and conduits in place, so that when it is applied to any vehicle equipped with a central lubricating system it is merely necessary to couple the inlet of the generator oil conduits to a branch of the system.

I claim:

1. The combination with an automobile chassis and an accessory machine thereon, of a lubricating system including a central lubricant reservoir, a plurality of lubricant filled conduits into which lubricant is forced from the reservoir, restricted flow proportioning lubricant outlets at certain of the chassis bearings and restricted flow proportioning lubricant outlets at the bearings of said machine, the chassis bearing outlets including fittings affording a restricted, high resistance flow path and each machine bearing outlet including a plurality of generally similar fittings in series.

2. A lubricant supply unit adapted for attachment to the end castings of a generator, said supply unit including a supply pipe and a pair of flow restriction fittings receiving lubricant from said pipe and adapted to be screwed into the oil inlets at the generator end castings.

3. A lubricant supply means adapted for attachment to the end castings of a generator, said supply means including a supply pipe, a pair of flow restriction fittings receiving lubricant from said pipe and adapted to be applied at oil inlets at the generator end castings, said pipe having terminal connections with both fittings, one of said fittings having an inlet for admission of lubricant to the supply pipe.

4. As a new article of manufacture, an oil inlet fitting for supplying minute quantities of lubricant from a central source and under pressure to a bearing or the like, including a pair of fitting members coupled together in series each fitting member having an oil flow passageway substantially filled with a flow restriction pin.

5. As a new article of manufacture, an oil inlet fitting for supplying lubricant at a slow rate to a bearing or the like, including a pair of fitting members coupled together in series, each fitting member having an oil flow passageway substantially filled with a flow restricting pin, at least one of said members having a check valve to prevent return flow of lubricant.

6. A lubricant supply fitting having a high resistance flow passage therethrough and a plurality of serially arranged spring held check valves in said passage, each affording an additional resistance to flow.

7. A lubricant supply fitting having a flow passage therethrough and a plurality of serially arranged means in said passage each affording a minute flow area and a high flow resistance, and a plurality of serially arranged one-way spring check valves one of said valves being arranged at the outlet of the fitting and the other of the said valves being arranged intermediate the flow resistance elements.

8. A lubricant supply fitting adapted for use with a centrally fed distributing system and adapted to supply minute quantities of oil to a bearing from said system, the fitting including a pair of body members disposed substantially at right angles to each other and coupled together and providing a generally L-shaped flow passageway therethrough and flow restriction means in each arm of the L.

9. A lubricant supply fitting adapted for use with a central distributing system and adapted to supply minute quantities of oil to a bearing from said system, the fitting including a pair of body members disposed substantially at right angles to each other and coupled together and providing a generally L-shaped flow passageway therethrough, flow restriction pins in each arm of the L, and a one-way flow valve arranged beyond each pin.

10. A lubricant supply fitting adapted for use with a central oil distributing system, the fitting including a pair of body members disposed substantially at right angles to each other and coupled together and providing a generally L-shaped flow passageway therethrough, flow restriction pins in each arm of the L, a one-way flow valve in the fitting, one of the bodies including means to engage an oil passageway in a bearing to be lubricated and the other body including means to engage a supply pipe.

11. In combination with an automobile chassis and an accessory mechanism supported thereupon at a substantial distance thereabove, a lubricant installation for bearings of said chassis and said machine comprising a lubricant reservoir, a plurality of lubricant-filled conduits leading to said bearings, a source of pressure for forcing lubricant from said reservoir into said conduits and flow proportioning devices at the outlets of said conduits for determining the lubricant supplied to said bearings, said device or devices supplying the bearing or bearings of said accessory mechanism being positioned a substantial distance above said bearing or bearings, and being connected thereto by gravity drains.

12. In combination with a generator enclosed in a horizontal longitudinal casing, said casing being provided with bearings in the central portions of the ends thereof, a lubricating installation for said bearings comprising a pressure conduit extending along the length of said longitudinal casing, a source of lubricant pressure supplying said pressure conduit, gravity conduits extending across the ends of said casing from the outside thereof to the central bearing and flow proportioning devices establishing communication between said pressure conduit and said gravity conduits.

13. In a central lubricating installation for a series of bearings at different levels, a lubricant reservoir, a plurality of lubricant filled conduits, a source of pressure for forcing lubricant from said reservoir into said conduits, flow proportioning devices at the outlets of said conduits and means associated with said devices for preventing a reverse flow through said outlets, said means consisting in part of single spring-seated check valves upon the bearings at the lower level outlets and double spring-seated check valves at the higher level outlets.

14. A lubricant supply fitting adapted for use with a central lubricating system having a flow passage therethrough and a plurality of serially arranged means in said passage, each affording a high flow resistance, and a one-way spring check valve arranged intermediate the flow resistance means.

15. A lubricant supply fitting adapted for use with a central lubricating system having a flow passage therethrough and a plurality of serially arranged means in said passage each affording a minute flow area and a high flow resistance, and a plurality of serially arranged strainers one before each serially arranged resistance means.

16. In an automobile vehicle having a chassis with a plurality of spaced bearings at a relatively low level maintained substantially at atmospheric temperature, said chassis supporting a relatively highly heated engine carrying a generator with a casing and a rotor having a horizontal shaft with bearings in said casing on either side of said rotor which bearings require relatively minute quantities of lubricant in comparison with the chassis bearings and from which excess quantities of lubricant must be immediately removed, said generator being positioned at a substantially higher level than said chassis bearings; the combination with a chassis lubricating system having a central supply and pressure source, and a branched distributing piping system extending to said chassis bearings with highly restricted flow metering outlets thereat, of a subsidiary generator lubricating system having a branched piping system connected to said first mentioned piping system leading to highly restricted flow metering outlets positioned at and substantially above said generator bearings, said generator casing having end castings in which said bearings are formed and said subsidiary system also including an inlet fitting, a vertical flow passage in an end casting of the generator into the inlet end of which said fitting is screwed, an overflow pipe for carrying off excess oil from the end casting, and an oil feed pipe substantially rigidly connected to the fitting and lying approximately parallel to the longitudinal axis of the generator.

17. In an automobile vehicle having a chassis with a plurality of spaced bearings at a relatively low level maintained substantially at atmospheric temperature, said chassis supporting a relatively highly heated engine carrying a generator with a casing and a rotor having a horizontal shaft with bearings in said casing on either side of said rotor which bearings require relatively minute quantities of lubricant in comparison with the chassis bearings and from which excess quantities of lubricant must be immediately removed, said generator being positioned at a substantially higher level than said chassis bearings; the combination with a chassis lubricating system having a central supply and pressure source, and a branched distributing piping system extending to said chassis bearings with highly restricted flow metering outlets thereat, of a subsidiary generator lubricating system having a branched piping system connected to said first mentioned piping system leading to highly restricted flow metering outlets positioned at and substantially above said generator bearings and including an upflow conduit bridging from the chassis to the generator to supply said outlets and means to prevent entrance of air to the system at said elevated outlets.

18. In an automobile vehicle having a chassis with a plurality of spaced bearings at a relatively low level maintained substantially at atmospheric temperature, said chassis supporting a relatively highly heated engine carrying a generator with a casing and a rotor having a horizontal shaft with bearings in said casing on either side of said rotor which bearings require relatively minute quantities of lubricant in comparison with the chassis bearings and from which excess quantities of lubricant must be immediately removed, said generator being positioned at a substantially higher level than said chassis bearings; the combination with a chassis lubricating system having a central supply and pressure source, and a branched distributing piping system extending to said chassis bearings with highly restricted flow metering outlets thereat, of a subsidiary generator lubricating system having a branched piping system connected to said first mentioned piping system leading to highly restricted flow metering outlets positioned at and substantially above said generator bearings and including a conduit bridging from the chassis to the generator to supply said outlets and one-way double check valves at the generator outlets preventing entrance of air into the system at such outlets.

19. In an automobile vehicle having a chassis with a plurality of spaced bearings at a relatively low level maintained substantially at atmospheric temperature, said chassis supporting a relatively highly heated engine carrying a generator with a casing and a rotor having a horizontal shaft with bearings in said casing on either side of said rotor which bearings require relatively minute quantities of lubricant in comparison with the chassis bearings and from which excess quantities of lubricant must be immediately removed, said generator being positioned at a substantially higher level than said chassis bearings; the combination with a chassis lubricating system having a central supply and pressure source, and a branched distributing piping system extending to said chassis bearings with highly restricted flow metering outlets thereat, of a subsidiary generator lubricating system having a branched piping system connected to said first mentioned piping system leading to highly restricted flow metering outlets positioned at and substantially above said generator bearings, said generator casing having end castings in which said bearings are formed, said end castings having vertical radial passageways therein extending approximately from the bearings to the tops of the castings and at their upper ends adapted for the reception of oil inlet fittings, and said castings below the bearings having downwardly and outwardly inclined flow passageways therein to carry off excess oil from the bearings.

20. In an automobile vehicle having a chassis with a plurality of spaced bearings at a relatively low level maintained substantially at atmospheric temperature, said chassis supporting a relatively highly heated engine carrying a generator with a casing and a rotor having a horizontal shaft with bearings in said casing on either side of said rotor which bearings require relatively minute quantities of lubricant in comparison with the chassis bearings and from which excess quantities of lubricant must be immediately removed, said generator being positioned at a substantially higher level than said chassis bearings; the combination with a chassis lubricating system having a central supply and pressure source, and a branched distributing piping system extending to said chassis bearings with highly restricted flow metering outlets thereat, of a subsidiary generator lubricating system having a branched piping system connected to said first mentioned piping system leading to highly restricted flow metering outlets positioned at and substantially above said generator bearings, said generator casing having end castings in which said bearings are formed, said castings having oil inlet openings therein for feeding oil to the bearing and having drain openings therein through which excess oil from the bearing may escape, and said outlets including oil inlet fittings comprising flow restricting drip plugs and adaptors for coupling said drip plugs to the oil inlet openings.

21. In an automobile vehicle having a chassis with a plurality of spaced bearings at a relatively low level maintained substantially at atmospheric temperature, said chassis supporting a relatively highly heated engine carrying a generator with a casing and a rotor having a horizontal shaft with bearings in said casing on either side of said rotor which bearings require relatively minute quantities of lubricant in comparison with the chassis bearings and from which excess quantities of lubricant must be immediately removed, said generator being positioned at a substantially higher level than said chassis bearings; the combination with a chassis lubricating system having a central supply and pressure source, and a branched distributing piping system extending to said chassis bearings with highly restricted flow metering outlets thereat, of a subsidiary generator lubricating system having a branched piping system connected to said first mentioned piping system leading to highly restricted flow metering outlets positioned at and substantially above said generator bearings, said generator casing having end castings in which said bearings are formed, said end castings including vertical inflow oil passages leading upwardly from said bearings, overflow openings below the bearings, and said outlets including flow restricting fittings at the inflow passages and a supply conduit rigidly coupled to said fittings and extending substantially longitudinally of the generator and spaced therefrom by the fittings.

22. In an automobile vehicle having a chassis with a plurality of spaced bearings at a relatively low level maintained substantially at atmospheric temperature, said chassis supporting a relatively highly heated engine carrying a generator with a casing and a rotor having a horizontal shaft with bearings in said casing on either side of said rotor which bearings require relatively minute quantities of lubricant in comparison with the chassis bearings and from which excess quantities of lubricant must be immediately removed, said generator being positioned at a substantially higher level than said chassis bearings; the combiantion with a chassis lubricating system having a central supply and pressure source, and a branched distributing piping system extending to said chassis bearings with highly restricted flow metering outlets thereat, of a subsidiary lubricating system for the generator bearings having a branched piping system connected to said first mentioned piping system leading to highly restricted flow metering outlets positioned at and substantially above said shaft bearings, said outlets for the generator shaft bearings having about twice the restriction of the chassis outlets, and means for excluding air, said means being associated with all of said outlets. the means at the generator shaft outlets being constructed and arranged so as to be of substantially greater air excluding properties.

JOSEPH BIJUR.